(12) United States Patent
Stek et al.

(10) Patent No.: US 6,667,949 B2
(45) Date of Patent: Dec. 23, 2003

(54) OPTICAL RECORD CARRIER AND SCANNING DEVICE

(75) Inventors: Aalbert Stek, Eindhoven (NL); Roel Van Woudenberg, Eindhoven (NL)

(73) Assignee: Koninklijke Philips Electronics N.V., Eindhoves ( * ) Notice: Subject to any disclaimer, the term of this patent is extended or adjusted under 35 U.S.C. 154(b) by 462 days.

(21) Appl. No.: 09/734,775

(22) Filed: Dec. 12, 2000

(65) Prior Publication Data

US 2001/0004340 A1 Jun. 21, 2001

(30) Foreign Application Priority Data

Dec. 15, 1999 (EP) .............................. 99204326

(51) Int. Cl.$^7$ ................................ G11B 7/00
(52) U.S. Cl. ................ 369/275.3; 369/44.26; 369/275.4
(58) Field of Search ................. 369/275.1, 275.3, 369/275.4, 44.26, 44.13, 47.27, 47.22, 47.28, 47.37

(56) References Cited

U.S. PATENT DOCUMENTS

| | | | |
|---|---|---|---|
| 4,375,088 A | * 2/1983 | de Haan et al. | 369/275.3 |
| 5,936,933 A | * 8/1999 | Miyamoto et al. | 369/275.3 |
| 6,144,625 A | * 11/2000 | Kuroda et al. | 369/53.23 |
| 6,452,897 B1 | * 9/2002 | Van Den Enden | 369/275.1 |

* cited by examiner

Primary Examiner—Thang V. Tran
(74) Attorney, Agent, or Firm—Michael E. Belk

(57) ABSTRACT

An optical record carrier is described comprising a track for carrying data encoded in optical marks. A parameter of the track has a periodic variation for generating a varying signal when scanning the track, for example a variation of the center of a pre-groove usually called wobble. The track further comprises reference elements, e.g. headers, interrupting the periodic variation. The phase of the periodic variation after the reference elements is indicative of a property of the record carrier for controlling the scanning of the record carrier in dependence of said property. In particular the phase may indicate whether or not the bottom of the pre-groove is closer to the scanning beam entry side of the disc. Further a scanning device is described comprising a detector for detecting said phase based on the varying signal. The device adapts its scanning control means to the indicated property.

12 Claims, 4 Drawing Sheets

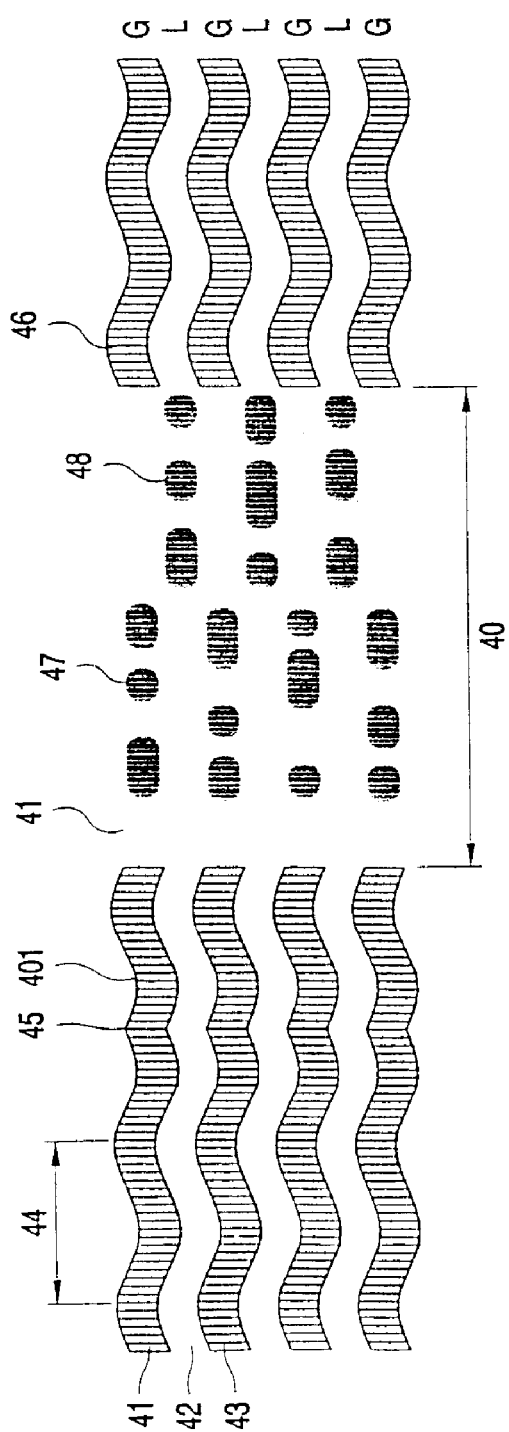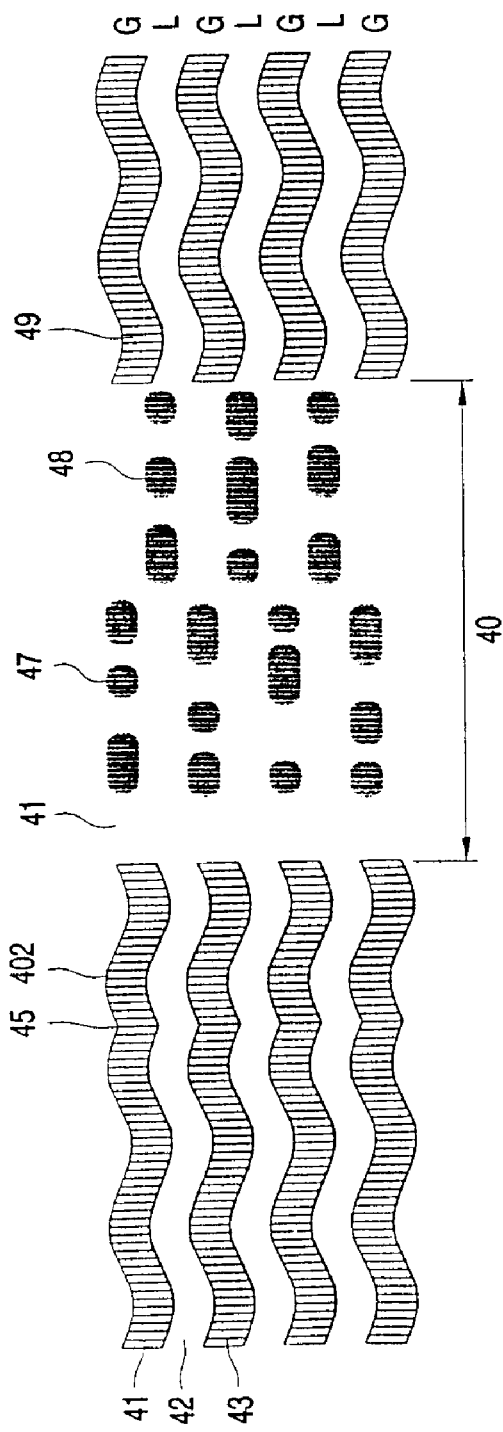

OPTICAL RECORD CARRIER AND SCANNING DEVICE

BACKGROUND SUMMARY OF THE INVENTION

The invention relates to an optical record carrier comprising a track for carrying data encoded in optical marks, a parameter of the track having a periodic variation for generating a varying signal when scanning the track, which track comprises reference elements interrupting the periodic variation.

The invention further relates to a device for scanning the optical record carrier, which device comprises a head and control means for scanning the track.

The invention further relates to a method for manufacturing the optical record carrier.

Such a record carrier and apparatus are known from U.S. Pat. No. 5,682,365 (PHN 9666). The document discloses a record carrier in the form of an optical disc having a recording area comprising a pattern of grooves on a substrate, constituting a pattern of circular or spiral tracks for carrying data digitally encoded in optical marks. A parameter of the tracks has a periodic variation, for example the width or the radial position, usually called wobble. The recording tracks are subdivided in longitudinal direction into track portions alternating with reference elements, e.g. headers comprising pre-recorded address marks. The pattern of tracks and headers are made during manufacture, e.g. in the form of a so-called pre-groove and pre-pits formed by embossing. The address marks represent position information for positioning a recording head on a desired track and are indicative for the address of the recording area following the address area. The record carrier is manufactured by first creating a master disc and thereafter replicating the disc. The groove may be formed in the master disc by applying a photo-resist layer on a substrate, expose it with the required pattern and etching unwanted material away. The remaining, intermediate surface is usually called land. The apparatus comprises an optical system for scanning the track for recording or reading information by generating a spot via a radiation beam on the track. The optical disc is rotated and the spot is positioned in radial direction on the center of the track by control means for scanning the track. During scanning a varying signal is generated corresponding to the periodic variation of the track. The varying signal is used to control the speed of the scanning. In a standardized recording system of a record carrier and a scanning device the radiation beam generates tracking signals in dependence of the geometric shape of the pre-groove, which tracking signals are processed in a predefined way in the device. The shape is determined by the manufacture process of the record carrier. Hence the standardized system sets fixed requirements for the manufacture process of the record carrier.

It is an object of the invention to provide a record carrier and a scanning device arranged for a more flexible record carrier manufacture process.

For this purpose a record carrier as described in the opening paragraph is characterized according to the invention in that the phase of the periodic variation after the reference elements is indicative of a property of the record carrier for controlling the scanning of the record carrier in dependence of said property. Further a scanning device as described in the opening paragraph is characterized in that the device comprises phase detection means for detecting the phase of the periodic variation after the reference elements and setting means for setting the control means in dependence of a property of the record carrier indicated by said phase. For a specific type of record carriers said phase is defined by selecting a positive direction for the periodic variation and determining the direction of the first half of the first instance of the periodic variation after the reference element. More in detail the phase may be determined in relation to a zero point defined in the periodic variation. The invention has the effect, that at least one property of the record carrier may be freely selected, and that the device may easily detect the selected property by detecting the phase of the periodic variation. Then the device sets the control means via the setting means based on the indicated property. Being able to select and indicate a property has the advantage that the manufacture process of the record carrier is more flexible.

The invention is also based on the following recognition. The reference elements are easily detectable in a scanning device, even without optimal setting of the scanning control means. Also the phase of the periodic variation in the track can be detected easily, because the corresponding varying signal has a relative low frequency when compared to read signals of the address marks or recorded marks representing digital data, and therefore setting of the scanning control means is less critical. For correctly reading said marks the scanning system must be fully operational, and therefore said marks cannot be used to transfer information for setting the scanning control means. Hence the phase of the periodic variation is suitable for indicating a property of the record carrier which influences the scanning signals.

An embodiment of the optical record carrier is characterized in that the track is scannable by a scanning beam via an entry side of the record carrier and comprises a groove relative to a surrounding surface, wherein said phase is indicative of whether or not the bottom of the groove is closer to the entry side than the surrounding surface. This has the advantage, that in the record carrier the groove may be an indentation in or a ridge protruding from the surrounding surface, which allows a choice of the number of replication steps. Due to the kind and/or number of steps the bottom of the groove may be closer to entry side of the record carrier or farther away, which is to be indicated by the phase of the periodic variation. A corresponding device is characterized in that the head is arranged for scanning the track by a scanning beam via an entry side of the record carrier and the control means are arranged for performing tracking control in accordance with a tracking signal generated by the head, the track comprising a groove arranged in a surrounding surface, and wherein the setting means comprise controllable inverting means for whether or not inverting the tracking signal in dependence of the detected phase indicating that the bottom of the groove is closer to the entry side than the surrounding surface.

Further advantageous, preferred embodiments of the record carrier and device according to the invention are given in the dependent claims.

These and other aspects of the invention will be apparent from and elucidated further with reference to the embodiments described by way of example in the following description and with reference to the accompanying drawings, in which

BRIEF DESCRIPTION OF THE DRAWINGS

FIG. 4 shows a reference element and a phase indicating a property,

Corresponding elements in different Figures have identical reference numerals.

DETAILED DESCRIPTION

Figure 1A:
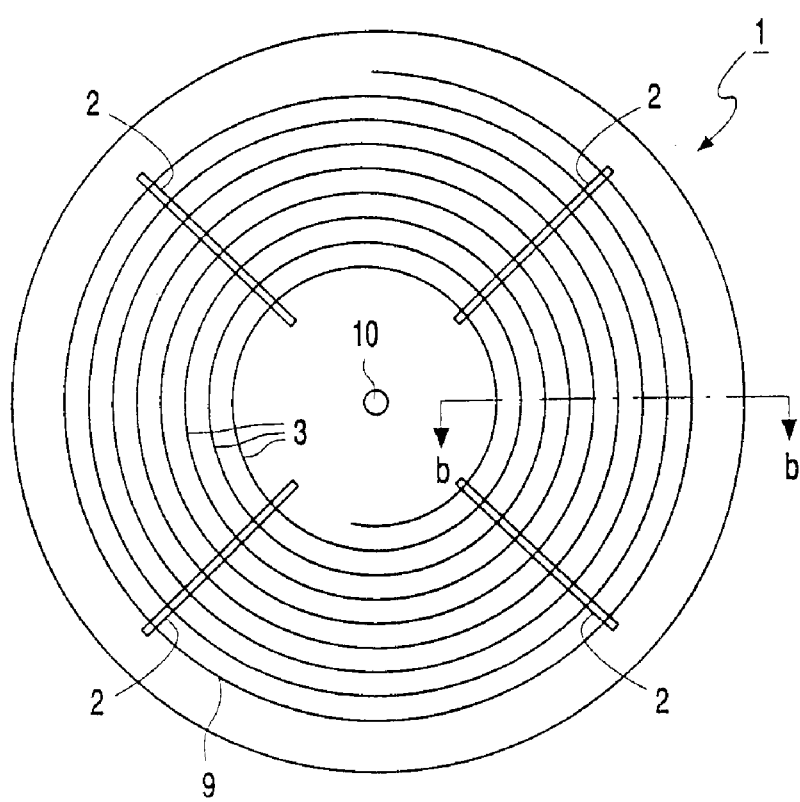
FIG. 1 shows a record carrier.

FIG. 1a shows a disc-shaped record carrier 1 having a track 9 intended for recording and a central hole 10. The track 9 is arranged in accordance with a pattern of turns constituting substantially parallel tracks in a spiral. The track 9 on the record carrier is indicated by a pre-embossed track structure provided during manufacture of the blank record carrier, usually called pre-groove which enables a read/write head to follow the track 9 during scanning. The invention is applicable in a corresponding manner to other track patterns in which the turns are concentric circles instead of a spiral, or having tracks constituted by optical marks representing user data, for example in a read-only record carrier manufactured by pressing. At least part of the tracks is provided with a periodic variation of a parameter of the track, for example the depth, width or radial position, usually called wobble. During scanning such periodic variation generates a varying signal component in the tracking signals, which may be used to control the scanning speed or the recording process. The periodic variation of the track 9 is interrupted by reference elements 2, which may be radially aligned as schematically indicated or may be at any suitable regular pattern. The reference elements 2 usually constitute headers which comprise address marks for determining the position of the following track portions 3. Headers subdivide the tracks in track portions 3 for carrying optical marks representing user information. The headers comprise position information indicative of the position of the header and the adjoining track portion relative to the beginning of the track or radial and angular parameters, e.g. address marks representing address information. Address marks on a recordable type of record carrier are usually embossed during manufacture to enable positioning of a read/write head anywhere on the still unrecorded record carrier. In alternative embodiments of the record carrier tracking or focussing marks may be applied as reference elements. In an embodiment of the record carrier the reference elements are elements of the periodic variation itself, e.g. a phase jump 45 of the wobble as shown in FIG. 4, a very short wobble usually called fine clock mark, or a synchronization mark formed by a few wobble elements deviating from the other wobbles in a predefined way.

Figure 1B:
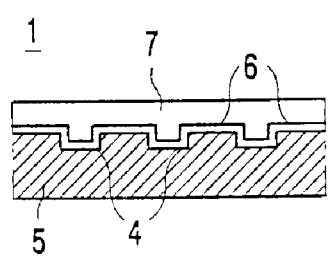

FIG. 1b is a cross-section taken along the line b—b of the record carrier 1, in which a transparent substrate 5 is provided with a recording layer 6 and a protective layer 7. The pregroove 4 may be implemented as an indentation or a protrusion, or as a material property deviating from its surroundings. The recording layer 6 may be optically or magneto-optically (MO) writable by means of a device for writing information, for example as in the known CD-Recordable system. During writing, the recording layer is locally heated by a beam of electromagnetic radiation, such as laser light. The recording layer in a re-writable record carrier is constituted, for example, by a phase-change material which acquires an amorphous or crystallized state when it is heated to the correct extent.

Figure 1C:
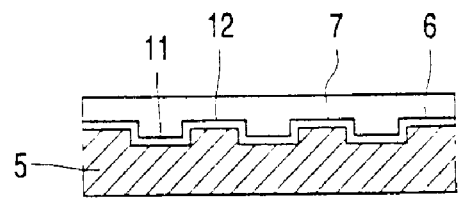

FIG. 1c shows an alternative track structure consisting of alternating elevated and deepened tracks, called lands 11 and grooves 12. It is to be noted, that both lands 11 and grooves 12 serve as recording tracks. For a spiral pattern the grooves may be continued as grooves after the header area constituting a double spiral by the concatenated lands and the concatenated grooves. Alternatively a transition from land to groove or vice versa is established by switching to the other type after the header area, for example each turn has at least header interrupting the lands and grooves for said switching.

Figure 2A:
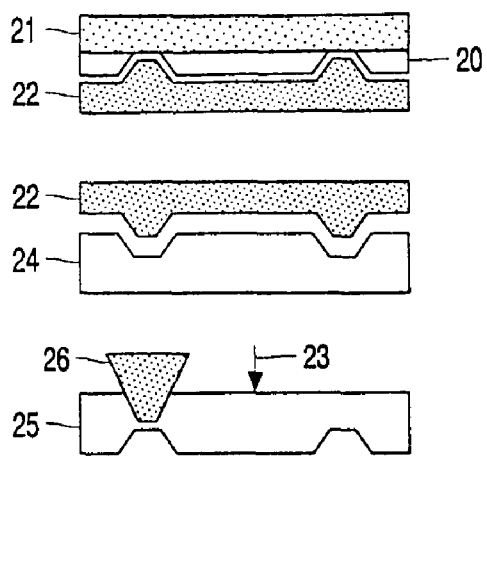
FIG. 2 shows a replication process for optical discs.
Figure 2B:
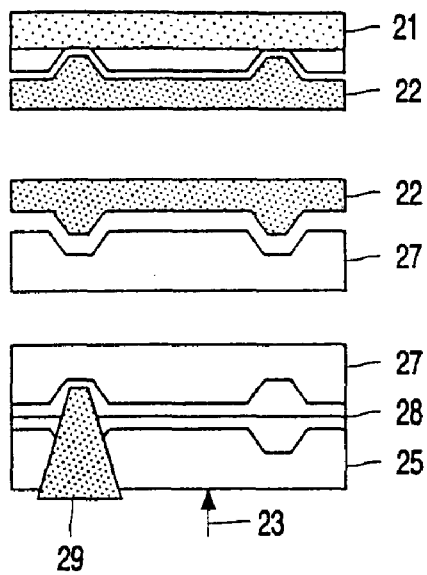

FIG. 2 shows a replication process for optical discs, for example Compact Disc (CD) or Digital Versatile Disc (DVD). Such optical discs are usually mass produced by pressing techniques using moulds called stampers. FIG. 2a shows on top a master disc 21 as a first step in the replication process for generating at least one stamper 22. The master disc 21 has a recording layer 20 in which a groove is created via usual techniques, such a exposure of a light sensitive photo-resist layer and etching away exposed material. In a second step the stamper 22 is used to manufacture a substrate 24, which step is repeated for each disc to be manufactured. In the final product, the optical disc 25, the substrate 24 is scanned from an entry side 23 by a beam 26 of radiation. Such a replication process for optical discs like CD is well known, and may have further intermediate production steps not discussed here. As schematically shown the groove in the master disc is replicated to a protrusion toward the entry side of the optical disc when viewed from the entry side. FIG. 2b shows a further replication process for manufacture a second, deeper layer in a multilayer optical disc, such as DVD. The production steps are similar; a further master disc 21 creates at least one further stamper 22, which generates a bottom substrate 27. The bottom substrate 27 is glued together via a transparent glue layer 28 to the substrate 25. The grooves in the bottom substrate in the final multilayer product are scanned via a beam 29 via entry side 23, and now the bottom of the grooves is farther away from the entry side. It is to be noted, that the depth of the grooves is not drawn to proportion, as the depth is substantially less than the thickness of the intermediate glue layer 28.

Figure 3A:
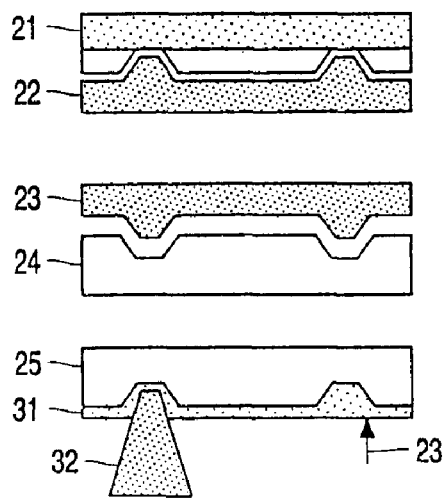
FIG. 3 shows a replication process for high density discs.
Figure 3B:
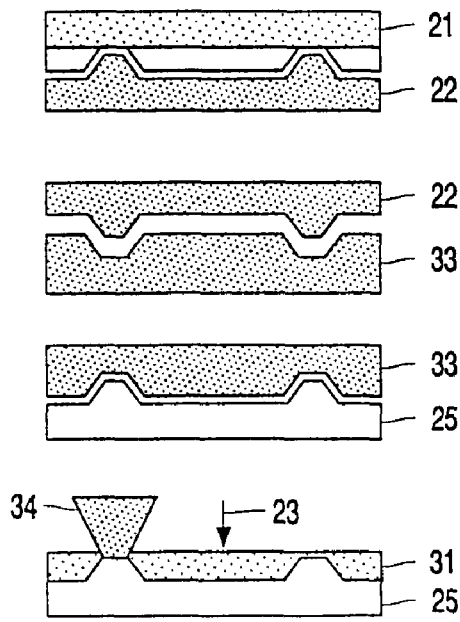

FIG. 3 shows a replication process for high density discs, similar to the process shown and described above with reference to FIG. 2. However, the substrate 25 manufactured by the above steps, is now covered with a transparent cover layer 31, which is thinner then the substrate 25 and therefore allows a higher density of optical marks. The tracks are scanned from the entry side 23 via the cover layer 23 by a beam 32 which is focussed to a smaller spot for writing and/or reading the higher density optical marks. The bottom of the groove is farther away from the entry side 23 than the surrounding surface. FIG. 3b shows a replication process with an additional step. The first stamper 22 now produces at least one positive stamper 33, which is used to produce the substrate 25. The tracks are scanned by beam 34 via the cover layer 31, and now the bottom of the groove is closer to the entry side 23. Such additional production steps may be necessary for accuracy reasons, or to efficiently produce a large number of optical discs. However the number of steps determines the property of the disc whether or not the bottom of the groove is closer to the entry side. According to the invention the manufacturing process and the number of steps are not limited by a fixed requirement for such a property of the disc. The manufacturer may chose a suitable production process, and the property which results from the process is indicated by the phase of the periodic variation of the track as described hereafter. Also other properties of the record carrier which influence the scanning of the track, may be chosen to be indicated by the phase, e.g. reflectivity or contrast of the optical marks. In an embodiment of the record carrier the property relates to the depth of the groove. The polarity of the radial servo signals when moving head in radial direction (transverse to the tracks) depends on the depth of the groove. Usually the groove is shallow, i.e. less deep than ¼ lambda (the wavelength of the scanning beam). However, a deeper groove may be manufactured, e.g. between ¼ and ½ lambda, and in that case the polarity of the radial servo signals is inverted, and further inversions occur for deeper grooves, e.g. normal polarity between ½ and ¾ lambda, etc. The property indicated by the phase indicates whether the depth of the groove results in normal or inverted polarity, which enables the manufacturer to select a depth. The scanning device detects the phase and adapts the radial servo system. Hence in the record carrier according to the invention at least one selected property is free to be chosen by the manufacturer, and the phase of the periodic variation is set correspondingly. In a multilayer disc the property may differ from layer to layer, which provides additional flexibility for the manufacturer, as each layer is provided with the phase corresponding to the property.

FIG. 4 shows a reference element and a phase indicating a property. FIGS. 4a and 4b show a land/groove track pattern with a differing phase in an enlarged and schematic way. A first groove 41 is interrupted by a reference element 40, usually a header area. A first land 42 radially adjoins the first groove 41, and a then a further groove 43 and lands and grooves follow. A parameter of the grooves is varied periodically, for example the location in radial direction, the so-called wobble. One period of the periodic variation is indicated by arrow 44. A phase jump 45 indicates that the header area is near. The header area is subdivided in a first portion 41 which has no tracks or marks, usually called a mirror area used for calibration of the tracking of focussing servo system in a scanning device. Thereafter in a first portion of the header area a groove header 47 or located in a second portion a land header 48 is provided, both comprising address marks which indicate the position on the record carrier. Of course alternatively the land header may be positioned in the first portion and the groove header in the second. After the reference element 40 the tracks and the periodic variation start again. In an alternative embodiment the periodic variation may show further modulation, e.g. for encoding the position in a track pattern without headers. The phase of the periodic variation is defined as the direction of the first element of the periodic variation after the reference element, i.e. in the case of wobble as shown the radial inward direction (upward in FIG. 4) of the first wobble may be defined as positive phase 46 and the radial outward direction as negative phase 49. FIG. 4a shows the positive phase 46 and FIG. 4b shows a negative phase 49. In a further embodiment the phase jump 45 may by itself form the reference element. The first wobble the shows a positive phase 402 in FIG. 4b and a negative phase 401 in FIG. 4a. It is to be noted that the phase is defined in relation to the preceding reference element 40, and that the phase of the periodic variation before the reference element may or may not correlate with the phase after the reference element, e.g. depending on the length of the intermediate track portion or further modulation of the periodic variation.

Figure 5:
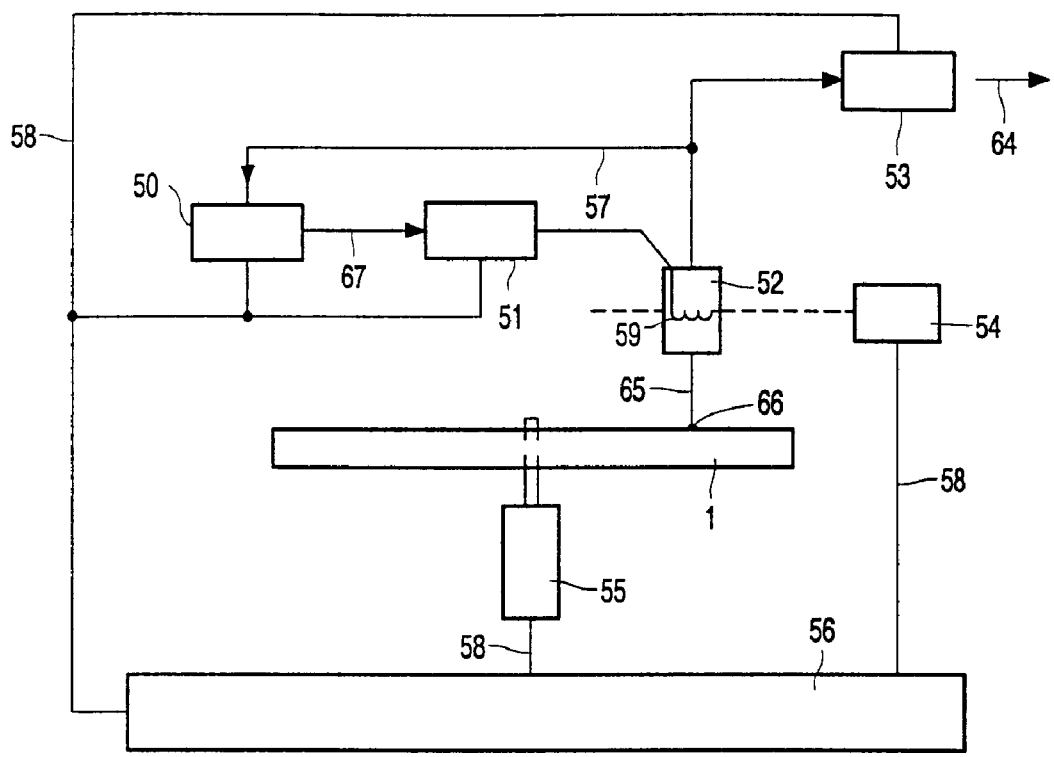
FIG. 5 shows an apparatus for reading a record carrier.
Figure 6:
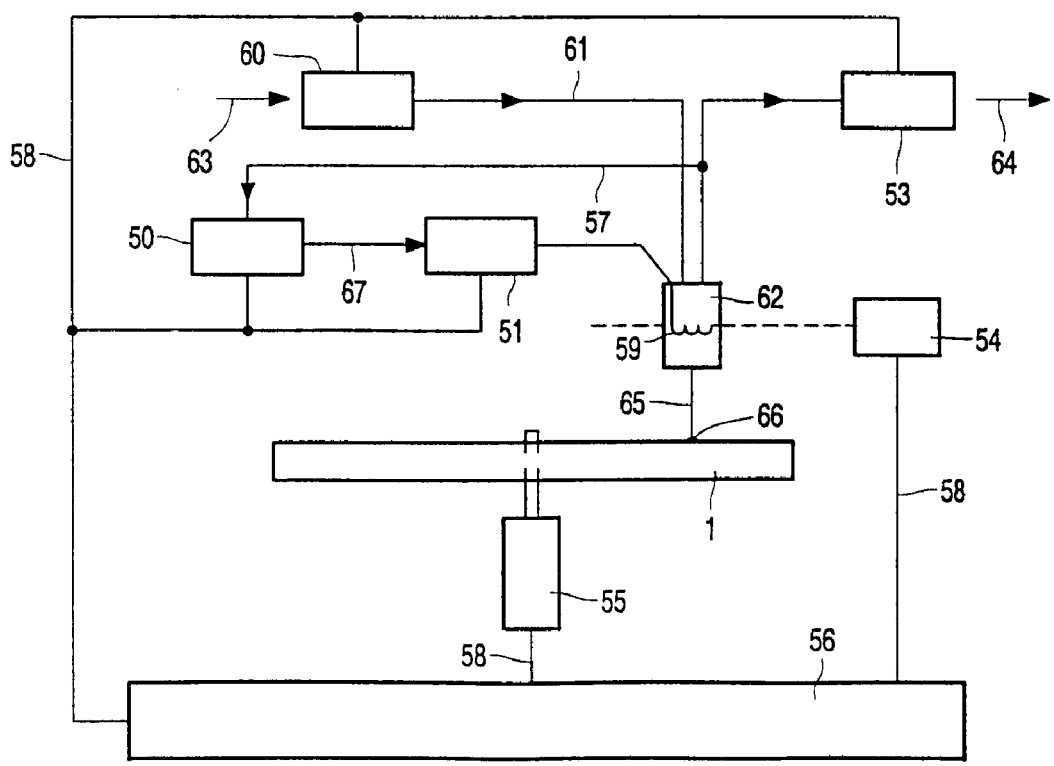
FIG. 6 shows an apparatus for writing and reading a record carrier.

FIGS. 5 and 6 show apparatuses according to the invention for scanning a record carrier 1. For scanning the record carrier the apparatus comprise a head, which may be a read and/or a write head, and control means, which comprise a control unit 56, drive means 55 for rotating the record carrier, and tracking means 51 and positioning means 54 to have the head follow a track to be scanned. The apparatus of FIG. 5 is arranged for reading the record carrier 1, which record carrier is identical to the record carrier shown in FIG. 1. The device is provided with a read head 52 for scanning the track on the record carrier and read control means comprising drive means 55 for rotating the record carrier 1, a reading unit 53 for example comprising a channel decoder and an error corrector, tracking means 51 and a system control unit 56. The read head comprises an optical system of a known type for generating a radiation spot 66 focused on a track of the recording layer of the record carrier via a radiation beam 65 guided through optical elements. The radiation beam 65 is generated by a radiation source, e.g. a laser diode. The read head further comprises a focusing actuator for focusing the radiation beam 65 on the recording layer and a tracking actuator 59 for fine positioning of the spot 66 in radial direction on the center of the track. The tracking actuator 59 may comprise coils for radially moving an optical element or may be arranged for changing the angle of a reflecting element on a movable part of the read head or on a part on a fixed position in the case part of the optical system is mounted on a fixed position. The radiation reflected by the recording layer is detected by a detector of a usual type, e.g. a four-quadrant diode, for generating a detector signals 57 including a read signal, a tracking error and a focusing error signal. The apparatus is provided with tracking means 51 coupled to the read head for receiving the tracking error signal from the read head and controlling the tracking actuator 59. During reading, the read signal is converted into output information, indicated by arrow 64, in the reading unit 53. The apparatus has positioning means 54 for coarsely positioning the read head 52 in the radial direction on the track, the fine positioning being performed by the tracking means 59. The device is further provided with a system control unit 56 for receiving commands from a controlling computer system or from a user and for controlling the apparatus via control bus 58, e.g. a system bus connected to the drive means 55, the positioning means 54, a phase detector 50, the tracking means 51 and the reading unit 53. To this end, the system control unit comprises control circuitry, for example a microprocessor, a program memory and control gates, for performing the procedures described below. The system control unit 56 may also be implemented as a state machine in logic circuits. The apparatus is provided with the phase detector 50 for detecting the phase of the periodic variation directly after a reference element as explained above with reference to FIG. 4. The phase is detected from a varying signal derived from the detector signals 57 which corresponds to the periodic variation of the track, e.g. in location, width, etc. For example the polarity of the first pulse of the varying signal may be detected, but alternatively a number of consecutive periods of the varying signal may be analyzed to determine the phase. Further the device comprises setting means for adjusting the tracking means 51 to the property indicated by the detected phase. The setting means may comprise a setting control circuit 67 for directly setting the tracking control means 51, or may be included in the control unit 56, e.g. implemented in a software procedure for setting the tracking control means 51 via the control bus 58. In an embodiment the setting means comprise controllable inverting means for whether or not inverting the tracking signal in dependence of the detected phase indicating that the bottom of the groove is closer to the entry side than the surrounding surface. In a different embodiment the setting means adapt the gain of the tracking control means 51 and/or the reading unit 53 to the reflectivity or contrast of the track, or to the polarity of the radial servo signal as indicated by the phase.

In an embodiment of the phase detector 50 the phase jump 45 is detected as the reference element, and the phase of the wobble immediately following the phase jump is detected and passed on to the setting means. This has the advantage, that the header fields need not be considered by the phase detector 50. The tracking means are set to the required operational state as soon as the phase is detected. In an embodiment the tracking means are first set to a phase detection state, in which the head is scanning a track which is closer to the entry side of the disc. After a reference element has been encountered the phase of the periodic variation is detected. In the case that the phase indicates that the groove of a land/groove track pattern has its bottom farther away from the entry side than the lands, the device knows that the head is currently scanning a land. The tracking means are now set to their normal operational state, and further position information may be detected. For example in a record carrier comprising headers the tracking means are arranged for detecting the address information in the headers. A land/groove track pattern may have land headers and groove headers on differing locations as shown in FIG. 4. In an embodiment the setting means are arranged for setting a first time window in the tracking means for detecting the land headers 48 and a second time window for detecting the groove headers 47 in dependence of the detected phase indicating the type of track that the head at that time is positioned above. The start of the time window may be measured from the mirror mark 41 or the phase jump 45.

FIG. 6 shows a device for writing information on a record carrier according to the invention of a type which is (re) writable in, for example a magneto-optical or optical manner (via phase change or dye) by means of a beam 65 of electromagnetic radiation. The device is also equipped for reading and comprises the same elements as the apparatus for reading described above with FIG. 5, except that it has a write/read head 62 and recording means which comprise a write unit 60, which comprises for example a formatter, an error encoder and a channel encoder. The write/read head 62 has the same function as the read head 52 together with a write function and is coupled to the write unit 60. The information presented to the input of the writing means 60 (indicated by the arrow 63) is distributed over logical and physical sectors according to formatting and encoding rules and converted into a write signal 61 for the write/read head 62. The system control unit 56 is arranged for controlling the writing means 60 and for performing the position information recovery and positioning procedure as described above for the reading apparatus. During the writing operation, marks representing the information are formed on the record carrier. Writing and reading of information for recording on optical discs and usable formatting, error correcting and channel coding rules, are well-known in the art, e.g. from the CD system. In particular the phase detecting means 50 are arranged for detecting the phase and the setting means for setting the scanning control means before the writing process is started. In an embodiment the setting means are arranged for adjusting the writing process to the material property indicated by the detected phase.

Although the invention has been explained mostly by embodiments using a land/groove pattern of tracks and radially aligned headers, it will be clear that other patterns, e.g. recording in grooves only without headers, can be employed in the invention. Also, a disc of a recordable type has been described, but the invention can be applied also to discs comprising recorded data, or discs of a read-only type. For example the record carrier may also be a magnetic type disc or a tape. Further, the scope of the invention is not limited to the embodiments, and the invention lies in each and every novel feature or combination of features described above. It is noted, that the invention may be implemented by means of hardware and/or software, and that in this document the word 'comprising' does not exclude the presence of other elements or steps than those listed and the word 'a' or 'an' preceding an element does not exclude the presence of a plurality of such elements, that any reference signs do not limit the scope of the claims, that 'means' may be represented by a single item or a plurality and that several 'means' may be represented by the same item of hardware.

What is claimed is:

1. Optical record carrier comprising a track for carrying data encoded in optical marks, a parameter of the track having a periodic variation for generating a varying signal when scanning the track, which track comprises reference elements interrupting the periodic variation, wherein the phase of the periodic variation after the reference elements is indicative of a property of the record carrier for controlling the scanning of the record carrier in dependence of said property.

2. Optical record carrier as claimed in claim 1, characterized in that the track is scannable by a scanning beam via an entry side of the record carrier and comprises a groove relative to a surrounding surface, wherein said phase is indicative of whether or not the bottom of the groove is closer to the entry side than the surrounding surface.

3. Optical record carrier as claimed in claim 1, wherein the reference elements comprise a phase jump of the periodic variation, header information, a synchronization mark or a mirror mark.

4. Optical record carrier as claimed in claim 1, wherein the track also comprises lands constituted by said surface between adjacent grooves.

5. Optical record carrier as claimed in claim 1, wherein the parameter of the track is the radial position or width of the track.

6. Optical record carrier as claimed in claim 1, wherein the record carrier has at least two layers of tracks, the property indicated by said phase being different between said layers.

7. Optical record carrier as claimed in claim 1, wherein the record carrier comprises recorded data.

8. Device for scanning an optical record carrier comprising a track for carrying data encoded in optical marks, a parameter of the track having a periodic variation, which track comprises reference elements interrupting the periodic variation, which device comprises a head and control means for scanning the track, and detection means for detecting the phase of the periodic variation after the reference elements and setting means for setting the control means in dependence of a property of the record carrier indicated by said phase.

9. Device as claimed in claim 8, characterized in that the head is arranged for scanning the track by a scanning beam via an entry side of the record carrier and the control means are arranged for performing tracking control in accordance with a tracking signal generated by the head, the track comprising a groove arranged in a surrounding surface, and wherein the setting means comprise controllable inverting means for whether or not inverting the tracking signal in dependence of the detected phase indicating that the bottom of the groove is closer to the entry side than the surrounding surface.

10. Device as claimed in claim 8, characterized in that the device comprises recording means for recording data in the track.

11. Device as claimed in claim 8, characterized in that the setting means are arranged for setting a time window for detecting header information in dependence of the detected phase.

12. Method of manufacturing an optical record carrier comprising a track for carrying data encoded in optical marks, the method comprising manufacturing a master record carrier and replicating the master record carrier via a number of replication steps, in which method a parameter of the track is provided with a periodic variation for generating a varying signal when scanning the track, and which track is provided with reference elements interrupting the periodic variation, and wherein the phase of the periodic variation after the reference elements is set to indicate a property of the record carrier that is determined by the method of manufacturing.

* * * * *